(No Model.)
S. M. WIER.
REACH COUPLING FOR VEHICLES.
No. 380,541. Patented Apr. 3, 1888.
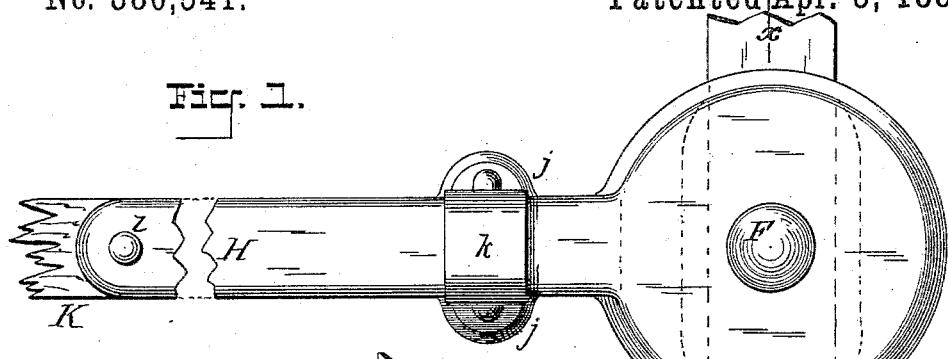
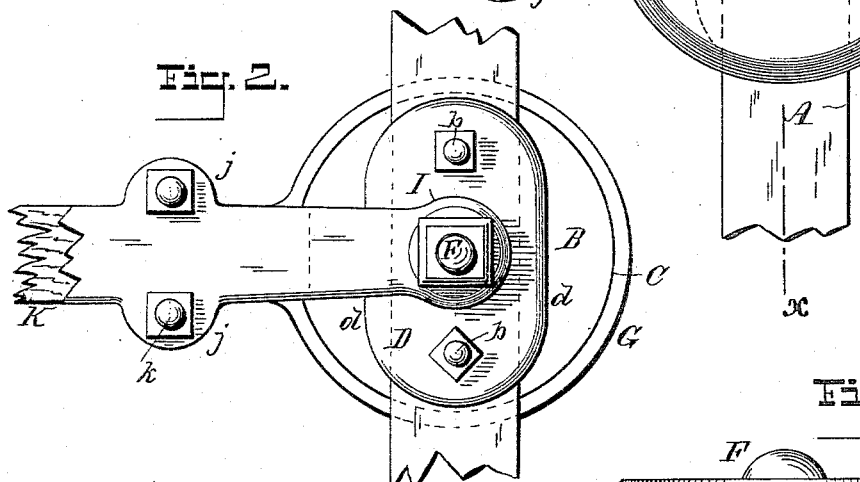
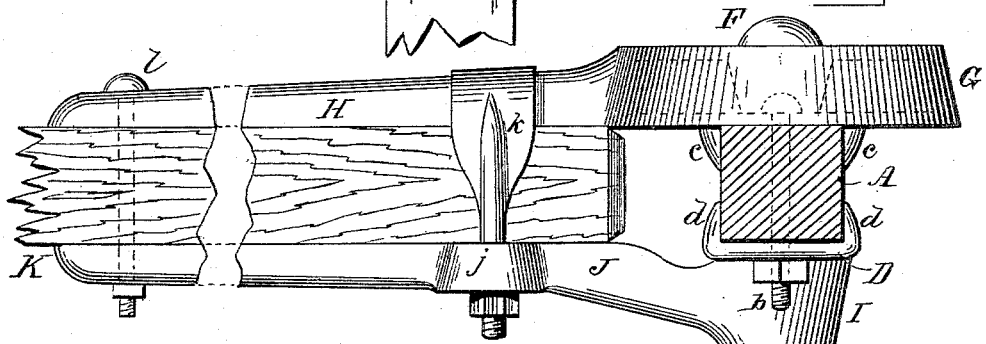
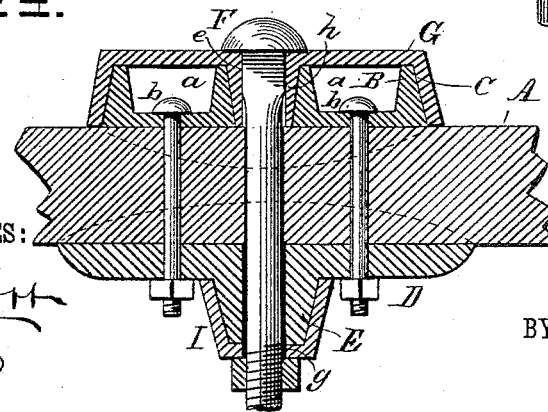
WITNESSES:
O. D. Mott
C. Sedgwick
INVENTOR:
S. M. Wier
BY
ATTORNEYS.

UNITED STATES PATENT OFFICE.

STEPHEN M. WIER, OF NEW HAVEN, CONNECTICUT.

REACH-COUPLING FOR VEHICLES.

SPECIFICATION forming part of Letters Patent No. 380,541, dated April 3, 1888.

Application filed November 26, 1887. Serial No. 256,269. (No model.)

*To all whom it may concern:*

Be it known that I, STEPHEN M. WIER, of New Haven, in the county of New Haven and State of Connecticut, have invented a new and Improved Fifth-Wheel and Reach-Coupling, of which the following is a specification, reference being had to the annexed drawings, forming a part thereof, in which—

Figure 1 is a plan view of my improved reach-coupling. Fig. 2 is an inverted plan view. Fig. 3 is a side elevation, and Fig. 4 is a section taken on line $x\ x$ in Fig. 1.

Similar letters of reference indicate corresponding parts in all the views.

The object of my invention is to provide a device for connecting the reach to the front axle of a vehicle, which will be provided with large adjustable wearing-surfaces, and in which the king-bolt is not subjected to wear.

My invention consists in the combination, with the axle and reach of a vehicle, of conical bearings secured to the axle, and conical sockets attached to the reach for receiving the bearings of the axle, all as hereinafter more fully described.

To the upper side of the axle A, at the center thereof, is fitted a circular iron, B, having a conical periphery, C, and an annular recess, $a$, for receiving the heads of the bolts $b$, by which the iron is secured to the axle. The iron is also provided with clips $c$, which embrace opposite sides of the upper part of the axle. To the under side of the axle A is fitted the oblong iron D, having clips $d$ for embracing opposite sides of the lower parts of the axle, and provided with a conical projection, E. The irons B D and the axle A are centrally apertured to receive the bolt F, by which the several parts of the coupling are fastened together. The iron D is apertured to receive the bolts $b$, by which the said iron and the iron B are secured to the axle A.

To the conical periphery C of the iron B is fitted a conical socket, G, provided with a central boss, $h$, which projects into the central part of the iron B and has a square aperture, $e$, for receiving the bolt F. An arm, H, formed integrally with the socket G, extends over the upper surface of the reach K, and is provided at its extremity with an aperture for receiving the fastening-bolt.

To the conical projection E is fitted a conical socket, I, having an aperture, $g$, for receiving the bolt F. An arm, J, formed integrally with the socket I, extends along the under surface of the reach K, and is provided with a bolt-hole corresponding with the aperture in the arm H. The arm J is provided with apertured ears $j$ for receiving the clip $k$, which embraces the arm H, the reach K, and the arm J. The bolt $l$ extends through the arm H, the reach K, and the arm J, clamping the parts firmly together.

It will be observed that with my improved coupling the wear is removed from the king-bolt F, and is transferred to the conical periphery C of the iron B and the conical projection E of the iron D.

The conical form of the wearing-surfaces permits of adjusting the coupling so as to take up wear and avoid rattling.

Having thus fully described my invention, I claim as new and desire to secure by Letters Patent—

1. In a fifth-wheel and reach-coupling for vehicles, the combination, with the axle A and reach K, of the iron B, provided with the conical periphery C, the iron D, provided with the conical projection E, the socket G, provided with the arm H, and the socket I, provided with the arm J, substantially as specified.

2. As an improved article of manufacture, a fifth-wheel and reach-coupling formed of the iron B, provided with the conical periphery C and with clips $c$, the socket G, fitted to the iron B and provided with the arm H, the oblong iron D, having the conical projection E and provided with the clips $d$, the arm J, having a socket, I, and the bolt F, adapted to hold the iron B, socket G, and the iron D and socket I in the position of use, substantially as specified.

STEPHEN M. WIER.

Witnesses:
P. BONNETTE SCHURMAN,
JAMES OLMSTEAD.